June 11, 1968

A. B. BROERMAN 3,387,496

PNEUMATIC AMPLIFIER SAMPLING VALVE FOR
CHROMATOGRAPHIC ANALYZERS

Filed June 20, 1966

INVENTOR.
A. B. BROERMAN
BY *Young & Quigg*
ATTORNEYS

INVENTOR.
A. B. BROERMAN

INVENTOR.
A. B. BROERMAN
BY Young & Quigg
ATTORNEYS

INVENTOR
A. B. BROERMAN
BY *Young & Quigg*
ATTORNEYS

United States Patent Office 3,387,496
Patented June 11, 1968

3,387,496
PNEUMATIC AMPLIFIER SAMPLING VALVE
FOR CHROMATOGRAPHIC ANALYZERS
Arthur B. Broerman, Bartlesville, Okla., assignor to Phillips Petroleum Company, a corporation of Delaware
Filed June 20, 1966, Ser. No. 558,742
6 Claims. (Cl. 73—422)

This invention relates to a multi-port, diaphragm-sealed valve mechanism. In one of its aspects it relates to a fluid-actuated, multi piston-operated, sampling valve for a chromatographic analyzer having a means for reducing pressure on the diaphragm so that the carrier gas can overcome the inherent stiffness of the sealing diaphragm in combination with a means for supplying a pressure signal to the pistons so that the valve can be used to sample a high pressure gas stream.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity, and simplicity of operation make this type of analyzer very attractive for use in automatic process control. There are, however, some apparently inherent features of chromatography which have appeared to be obstacles in adapting chromatography to wide-spread use in process control.

One problem occurs when an attempt is made to use a sampling valve in a high pressure gas stream. The carrier gas is at moderate pressures, for example 30 p.s.i. whereas high pressure gas streams are in excess of 500 p.s.i., up to 1000 or even 5000 p.s.i.

In U.S. 3,140,615, Arthur B. Broerman, there is disclosed and claimed a suitable fluid-actuated, multi piston-operated, sampling valve which can be used for chromatographic analysis. This valve is operable up to about 300 p.s.i. very satisfactorily. However, at higher pressures, the sample gas pressure overcomes the force of the springs in the bottom part of the valve and unseat the plungers during the operation, causing leakage from one cavity to the next within the valve.

It has been proposed to overcome the force of the sample gas on the plungers by supplying fluid pressure to the pistons in addition to that supplied by the bottom springs. Due to the construction of the device, the fluid pressure also flows to the upper spring chamber and to the diaphragm seal. This pressure causes sealing in the areas in which the pistons are not in sealing engagement with the diaphragm due to the fact that the carrier gas is at 30 p.s.i. and at that pressure it is not sufficient to overcome the force of the pressure on the underside of the diaphragm. Thus, applying pressure to the spring piston chambers causes improper flow of carrier gas to the sampling valve.

It has been found that the valve disclosed and claimed in U.S. 3,140,615 operates best if the spring chamber is evacuated so that a vacuum is drawn against the underside of the diaphragm. Using this vacuum draw on the underside of the diaphragm, carrier gas can easily overcome the inherent stiffness of the diaphragm and flow through the valve ports when open as desired.

I have now discovered that a valve similar to that disclosed and claimed in U.S. 3,140,615 can be used to sample high pressure gas streams without loss of carrier gas flow characteristics by blocking off the passage between the upper spring piston chamber and the lower spring piston chamber and using a signal pressure in the lower spring piston chamber as well as in the central piston chamber to drive the pistons.

By various aspects of this invention, one or more of the following, or other, objects can be obtained.

It is an object of this invention to provide a chromatographic analyzer sampling valve which can be used to sample gas at high pressure using a carrier gas at relatively low pressure.

It is a further object of this invention to provide a method for operating a fluid-actuated, multi piston-operated, sampling valve to sample fluid streams at high pressures using a carrier gas at relatively low pressures.

It is another object of this invention to provide a fluid-actuated, pneumatically-amplified, diaphragm-sealing, sampling valve for supplying sample slugs of a high pressure gas or liquid stream to the columns of a chromatographic analyzer.

It is a still further object of this invention to provide a fluid-actuated, pneumatically-amplified, diaphragm-sealing valve for a chromatographic analyzer wherein adequate plunger pressure maintains pistons in sealing contact without loss of flow of carrier gas at relatively low pressures.

Other aspects, objects, and several advantages of this invention are apparent to one skilled in the art from a study of this disclosure, the drawings, and the appended claims.

According to the invention, there is provided a two-position, fluid-actuated, diaphragm-sealed, sampling valve in which a positive pressure is used to actuate pistons which control movement of plungers which seal the chambers for high pressure sampling. A vacuum is maintained beneath the diaphragm to open up the carrier gas ports at predetermined time intervals. A passage between the piston chambers and the diaphragm area is closed off. A programmed signal pressure is used to supply pressure to the piston chambers.

The invention will now be described with reference to the accompanying drawings in which.

Figure 1:
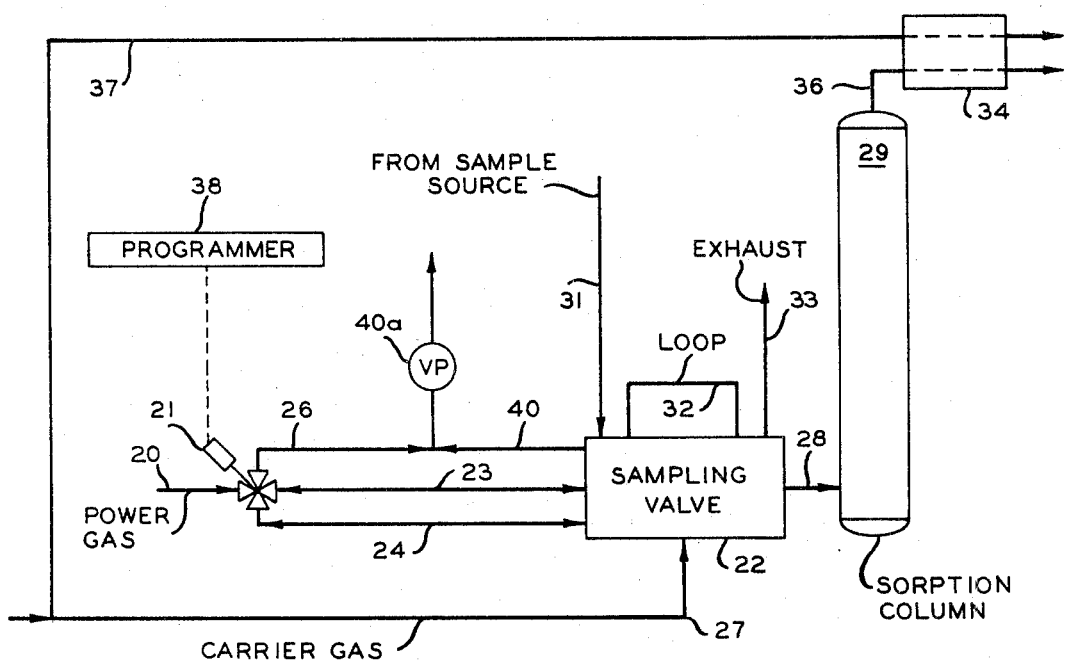
FIGURE 1 is a schematic flow diagram of a chromatographic analyzer system showing an embodiment of the invention.

Reference is now made to the drawing in detail, wherein like parts have been designated by like reference numerals, and to FIGURE 1 in particular, wherein a power gas, such as air, passes via conduit 20 to pilot valve 21, wherein the power gas stream is directed to a first chamber (not shown) of a pneumatically-actuated, diaphragm-sealed, sampling valve 22 via conduit 23 during a first time interval. Also, a second chamber (not shown) is vented through line 24, valve 21 and line 26. Vacuum pump 40a pulls a vacuum on line 26 as well as line 40 which draws a vacuum on a third chamber (not shown) which chamber is in communication with the underside of the sealing diaphragm to pull a continuous vacuum thereon as will be hereinafter described. In a second interval of time, the sampling valve 22 is vented via conduit 23, pilot valve 21, and pilot exhaust conduit 26. During this second interval of time, power gas passes through line 20, pilot valve 21, and conduit 24 to supply pressure to the second chamber. Valve 21 can be any suitable four-way valve or can be a combination of two or more three-way valves as will be hereinafter described with reference to FIGURES 5 and 6. A carrier gas, such as helium or hydrogen, is passed via conduit 27, sampling valve 22, and conduit 28 to column 29. A sample source (not shown) such as from process stream, is connected to sampling valve 22 via conduit 31, being circulated through sample loop 32 of sampling valve 22, and vented therefrom via sample exhaust conduit 33. Periodically, the sample in loop 32 is passed along with the carrier gas, via conduit 28, to sorption column 29, where constituents of the sample are absorbed or adsorbed, depending upon the nature of the contact material, and then are selectively desorbed by a continuing flow of carrier gas therethrough to be identified and measured.

The effluent from the sorption column 29 passes through an analyzer, indicated as thermal conductivity assembly 34, via conduit 36. The output signal from the detector 34 is passed to a recording instrument (not shown), which can be a conventional strip chart recorder. A stream of carrier gas is passed via conduit 37 from conduit 27 directly to the reference cell of detector 34, so as to balance out the effect of the carrier gas in the column 29 effluent. The sample gas to be analyzed generally enters the system continuously through conduit 31. It is exhausted through conduit 33, even when a slug thereof is selected for analysis. Pilot valve 21 is actuated by programmer 38, which can be operated by a time cycle or other means.

When pilot valve 21 is changed from the first described position, power gas is now exhausted from sampling valve 22 via conduit 23. Carrier gas now passes to sample loop 32, collecting the sample trapped therein, and carrying the same to sorption column 29, via conduit 28. Thus, each time power gas is supplied to conduit 24 and gas is exhausted from conduit 23 through valve 21 and line 26, a measured sample is passed via conduit 28 to column 29 for sorption and desorption therein. The carrier gas carries the measured sample, as determined by the loop size, into the column.

Figure 2:
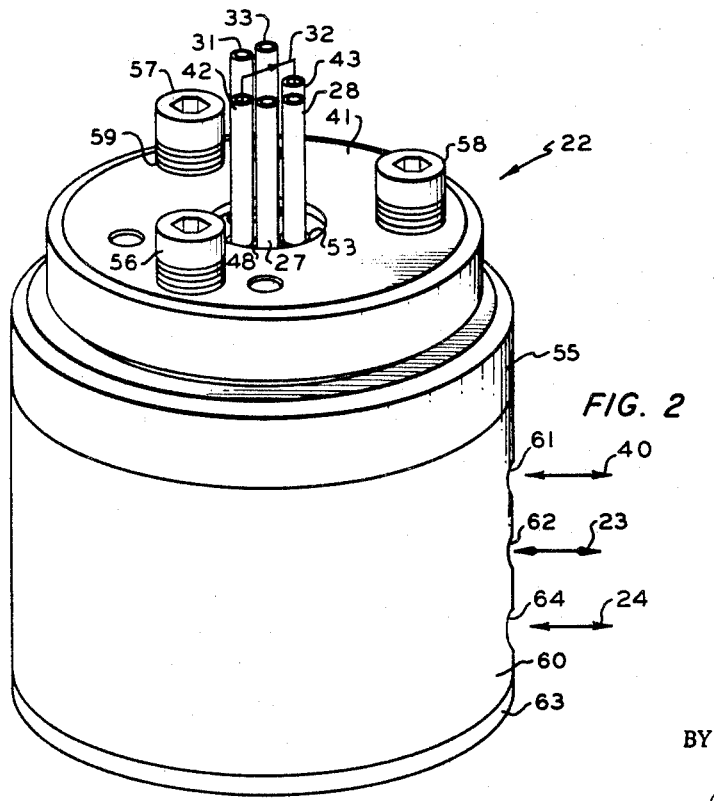
FIGURE 2 is a perspective view of an assembled fluid-actuated, diaphragm-sealed valve shown schematically in FIGURE 1.

In FIGURE 2, there is shown a perspective view of the assembled fluid-actuated flexible diaphragm sampling valve of this invention, generally designated 22. Sampling valve 22 comprises an upper cap 41 provided with six small diameter conduits 27, 28, 31, 33, 42 and 43, which communicate directly with the lower surface of upper block 41 by spaced vertical passages, such as 48. Sample loop 32 communicates between conduits 42 and 43. Conduit 42, for example, is press fitted into spaced passage 48, thereby effecting a seal. Silver brazing gives mechanical strength to the press fit to prevent twisting the conduit and breaking the seal. Adjacent to upper block is intermediate block 55 provided with a plurality of cylindrical passages (not seen) communicating between the upper and lower faces thereof. Allen headed cap screws 56 to 58 secure cap 41 to intermediate block 55, which is spaced therefrom by a flexible sealing diaphragm and cushion (not seen). Plural Belleville washers, such as 59, are positioned on the shaft of the cap screws. Washers 59 permit tightening down cap 41 evenly. This is due to the feel of slowly increasing torque as turning of cap screws 56 to 58 exerts downward pressure on cap 41, gradually compressing the washers flat. There is an abrupt change in the torque as the washers flatten, indicating that further cap screw tightening would damage diaphragm and/or cap. If desirable, the Belleville washers can be entirely eliminated. Preferably, however, there are some Belleville washers present.

Disposed adjacent and supporting body 55 is a cylindrical casing or sleeve 60, provided with threaded passages 61, 62 and 64. Passage 61 communicates with an internal upper spring chamber (not shown) defined by body 55 and an internally disposed first power piston (not seen). Passage 62 communicates with another internal annular chamber (not shown) disposed within casing 60. Passage 64 communicates with a lower spring chamber defined by a second power piston, casing 60 and third body 63, which serves as a closure pulley and forms the base of valve 22.

Figures 3, 3A:
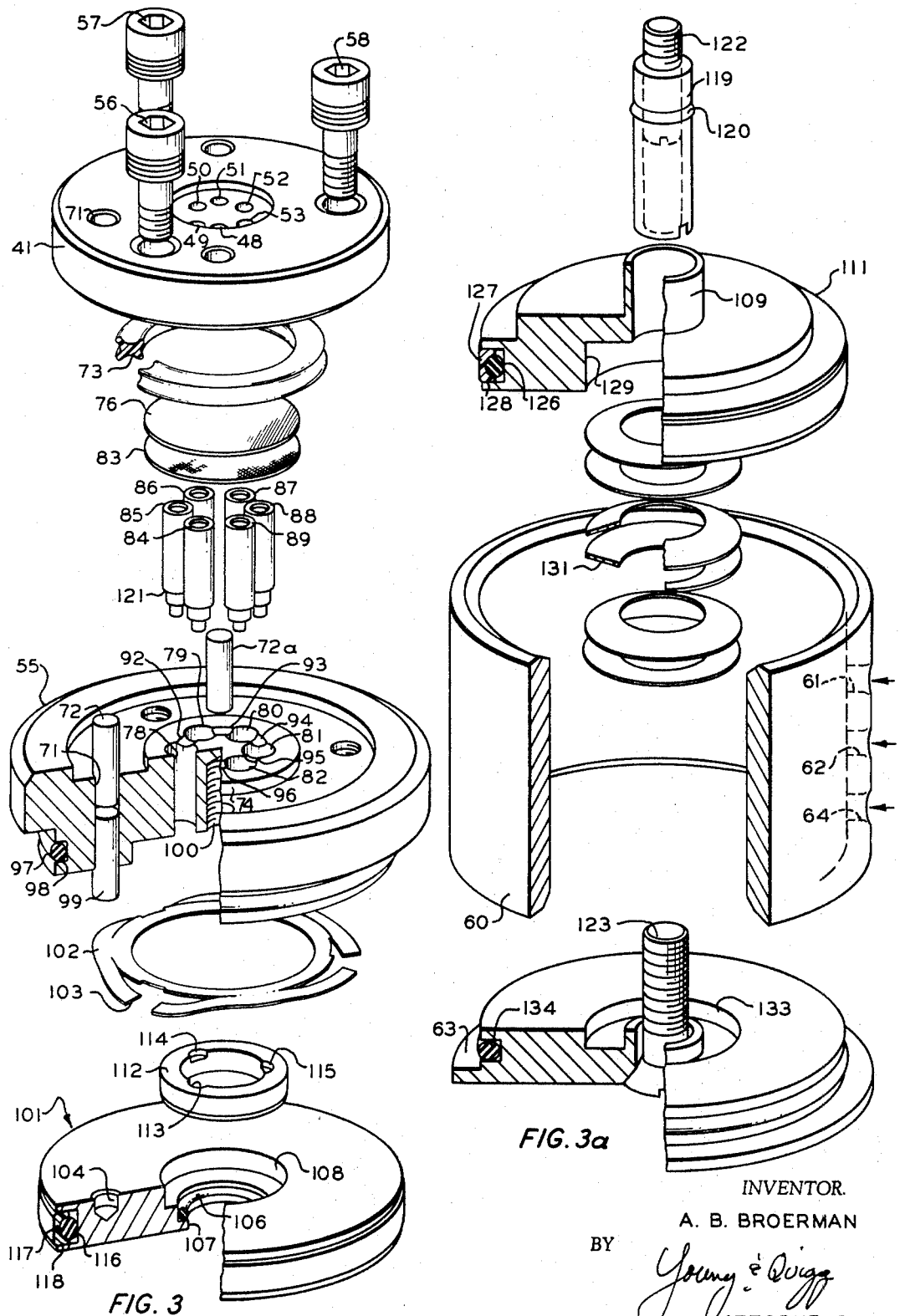
FIGURES 3 and 3a are exploded perspective views of the components of the diaphragm valve shown in FIGURE 2 arranged in the order of their assembly.

Referring now to FIGURES 3 and 3a, showing an exploded view of the sampling valve, cap 41 is provided with one or more vertical passages, such as 71 and 71a, which accommodate cap key pins, such as 72, that align cap 41 properly relative to body 55. A resilient quad-ring 73, of generally square cross-section, with concave sides, is disposed between cap 41 and body 55. Ring 73 is preferably composed of an elastomeric material which is chemically inert and heat resistant, such as silicone rubber, and seats on shoulder 74 of body 55 beneath cap 41.

A flexible sealing diaphragm 76, of a diameter about that of the inner diameter of raised portion 74, and at least sufficient to cover vertical passages 77 to 82, is disposed above body 55. Sealing diaphragm 76 is preferably composed of a thermosetting plastic which is chemically inert and heat resistant, such as Teflon (a polymer of tetrafluoroethylene).

Disposed between diaphragm 76 and body 55 is a cushion 83, which is suitably a 2 mil thick cloth of Dacron (a polyester fiber). It serves to prevent the Teflon sealing diaphragm from cold flowing, and also furnishes support for it to prevent ballooning under alternating carrier and power gas pressure, which results in an extended cycling life of the valve. Cushion 83 also serves to distribute pressure on the flexible diaphragm against the lower face of cap 41, thus evening out any variations in thickness of the diaphragm.

A set of metal plunger rods 84 to 89, are located within vertical passages 77 to 82, respectively, when the valve is assembled. These rods are machined to have a central relief in their upper end which provides an annular-shaped contact surface, that allows more sealing pressure per unit area to be exerted against the adjacent areas of cushion 83, as directed. Rods 85, 87 and 89 are 0.010 inch shorter than rods 84, 86 and 88.

Recesses 91 to 96, about 0.010–0.014 inch in depth, are provided within the circle described by passages 77 to 82, each recess communicating with the adjacent vertical passages. This type of communication between the vertical passages minimizes hang-up of sample fluid or carrier gas, and obviates excess pressure drop.

A resilient O-ring 97, of generally circular cross-section, is disposed in a peripheral slot 98 in the lower portion of body 55. This ring makes an air-tight seal between body 55 and supporting casing 60. Extending from the lower end of passage 71 is another key pin 99, that aligns body 55 properly relative to air-loaded first power piston 101. A threaded vertical recess 100 is disposed central of body 55 from the lower face.

A crimped, metal retracting spring 102 machined from a spring steel stock is disposed between the lower surface of body 55 and the upper surface of piston 101. The cutouts, such as 103, are aligned to permit the passage of key pins, such as 99, therethrough to anchor in recess 104 of piston 101.

A resilient O-ring seal 106, of generally circular cross-section, is disposed on a shoulder 107 within a passage 108 central of piston 101. As assembled, ring 106, makes sealing contact with collar 109 of spring-loaded, second power piston 111. An annular-shaped member 112, serves as a retainer for ring 106, and as a push disc for short plunger rods 85, 87 and 89. Disc 112 is provided with three notched out recesses, 113 to 115, which are adjacent to the lower ends of long plunger rods 84, 86 and 88. These recesses serve as reliefs preventing contact between the rods and disc 112. The lower edge of disc 112 is beveled to aid seating body 101. Another O-ring 116 and a cap seal 117 comprising a thermosetting plastic, such as Teflon, are disposed in a slot 118 in the periphery of piston 101, permitting a sealing contact with the inner wall of casing 60.

An internally threaded cylindrical bushing 119 is provided, having a diameter so that it may pass slidably within collar 109. This upper end of this bushing provides a stop for all the plunger rods in their retracted position, by the contacting of shoulder 121 of rod 84, for example. Assembly screw 122 secures the upper portion of bushing 119 to a threaded recess (not shown) in the lower face of body 55. Another assembly screw 123 secures base 63 to the lower portion of bushing 119, permitting all components between body 55 and base 63 to be compressively tightened together. Bushing 119 is provided with resilient O-ring 120 which is securely fastened thereto by being positioned in an annular slot in bushing 119. O-ring 120 contacts the inner surface of collar 109 of piston 111 to effectively seal off spring piston chamber below piston 111 from the spring piston chamber above piston 101.

An O-ring 126 and cap seal 127 are disposed in a slot 128 in the periphery of piston 111, permitting a sealing contact with the inner wall of casing 60.

A recess 129 is provided in the lower face of piston 111, located central thereof, to accommodate Belleville washers, such as 131, which are grouped in opposing pairs to give the desired amount of upward bias to spring-loaded piston 111, this forces and maintains longer piston rods, like 89, closed, while no power gas pressure is in the annular chamber 132 (see FIGURE 4) defined by pistons 101 and 111. According to the invention, power gas is used in lieu of or in addition to Belleville washers 131 to maintain piston rods 85, 87 and 89 closed while no power gas pressure is in piston chamber 132. Annular recess 133 in the upper face of base 63 provides a boss for washers 131. A resilient O-ring 134 is disposed in a peripheral slot 136 in base 63, permitting an air-tight seal between casing 60 and base 63.

Figure 4:
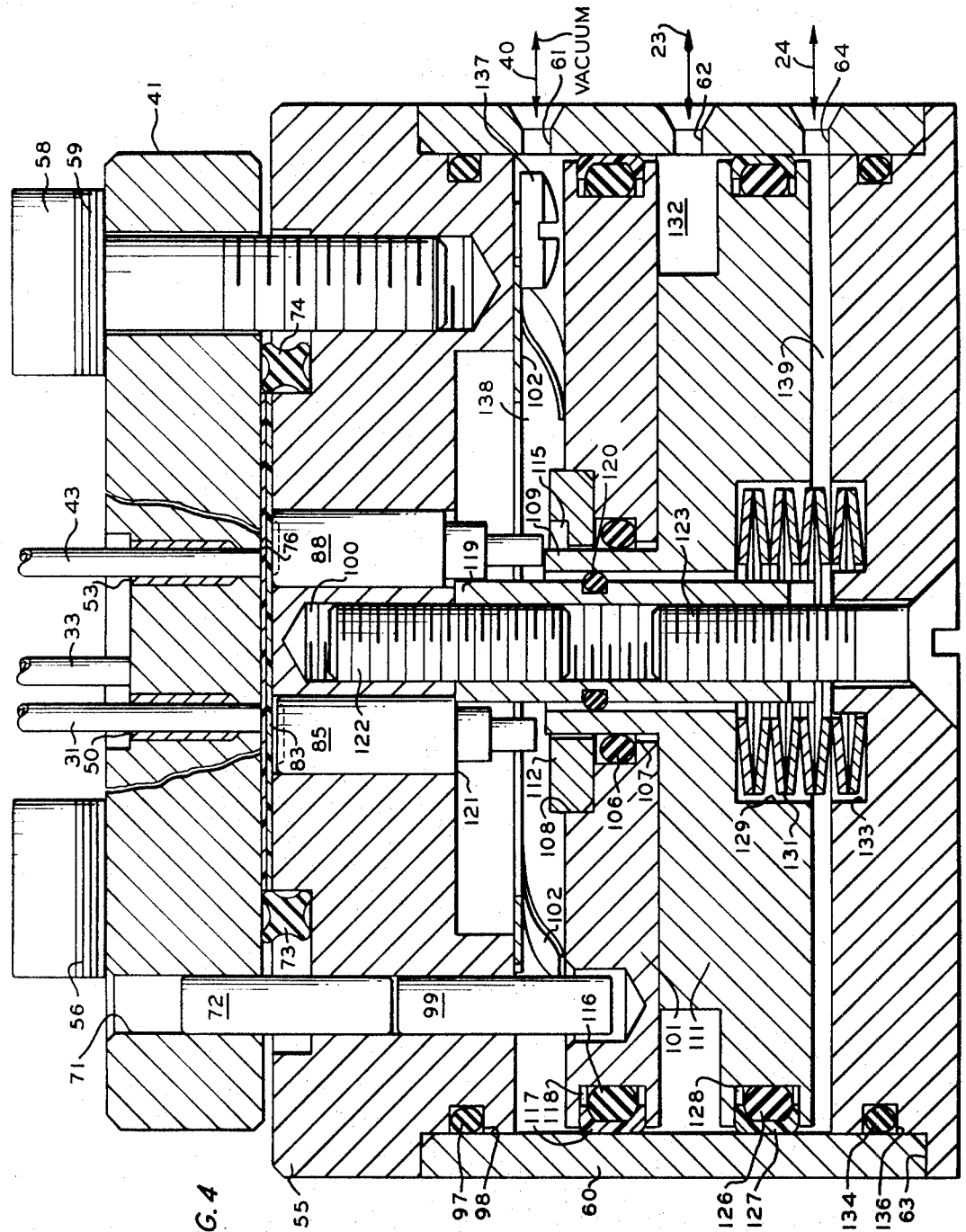
FIGURE 4 is a full sectional view of the assembled valve shown in FIGURES 2 and 3.

In FIGURE 4, the assembled valve is shown in full section, except for the assembly screws, pins and plunger rods. A screw 137 is seen which retains retracting spring 102 fastened to the lower surface body 55. Spring 102 is located in a chamber 138 defined by body 55 and air-loaded piston 111. The vacuum line 40, of the second embodiment, communicates via passage 61 with chamber 138. Chamber 138, in turn, is in communication with the underside of cushion 83 via the working tolerances surrounding the plunger rods, such as 88.

If it is desirable to have an area defined by a top of a plunger sealed off or blocked, then the plunger rod such as 85, for example, is made longer than usual so that shoulder 121 will rest on the shoulder of 119 when the top of the plunger rod is in sealing engagement with diaphragm 76.

Figure 5:
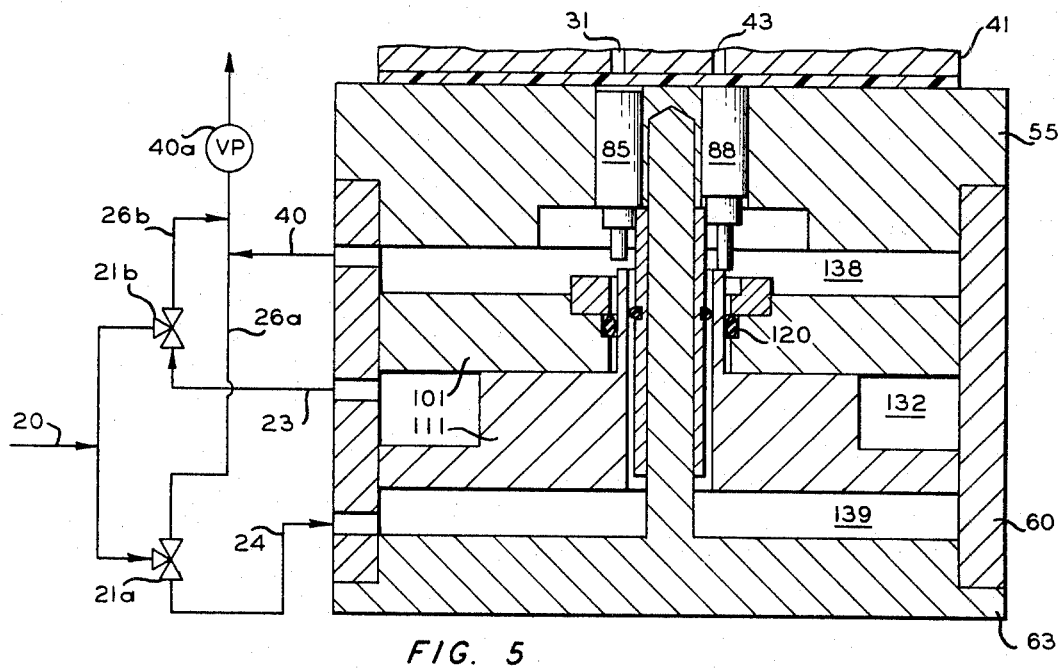
FIGURE 5 is a schematic diagram showing the operation of an embodiment of the invention during a first time interval.

In operation, and referring specifically to FIGURE 5, power gas passes through line 20, valve 21a, line 24 and into piston chamber 139. At this time, the valve is in the at-rest position and piston chambers 139 and 138 are expanded while chamber 132 is substantially collapsed. In this at-rest position, pressure in chamber 132 is evacuated through line 23, valve 21d, line 26b and through vacuum pump 40a. Pressure is also evacuated from chamber 138, which is in communication with the other side of the sealing diaphragm 76, the evacuation being made through line 40 and vacuum pump 40a.

At this time, carrier gas flowing continuously in conduit 27, under greater than ambient pressure, enters valve 22 via spaced passage 48, passing downwardly to lower face of cap 41, and over toward either spaced passage 49 or 53, depending upon whether piston rod 84 or 89 is in sealing contact with diaphragm. Since in the unexcited position only longer rod 84 is in sealing contact, carrier gas flows from recess 96 across the top of vertical passage 82, under the diaphragm, over a recess 95 and into spaced passage 53, and out of valve 22, via conduit 28 to sorption column 29. Concurrently, sampling fluid continuously flowing from sample source conduit 31, under greater than ambient pressure, enters valve 22 through spaced passage 50. Since longer rod 86 is in sealing contact with the diaphragm, sample fluid flows from recess 12 across the top of vertical passage 78 under the diaphragm, over to recess 91 and into passage 49, and out of valve 22, via conduit 42, into sample loop 32. Sample fluid re-enters valve 22 from loop 32 via conduit 43 and passage 52. Since longer rod 88 is in sealing contact with the diaphragm, sample flows from recess 94 across the top of vertical passage 80, under the diaphragm, over to recess 93 and into spaced passage 51, and out of valve 22, via conduit 33 to sample exhaust.

Figure 6:
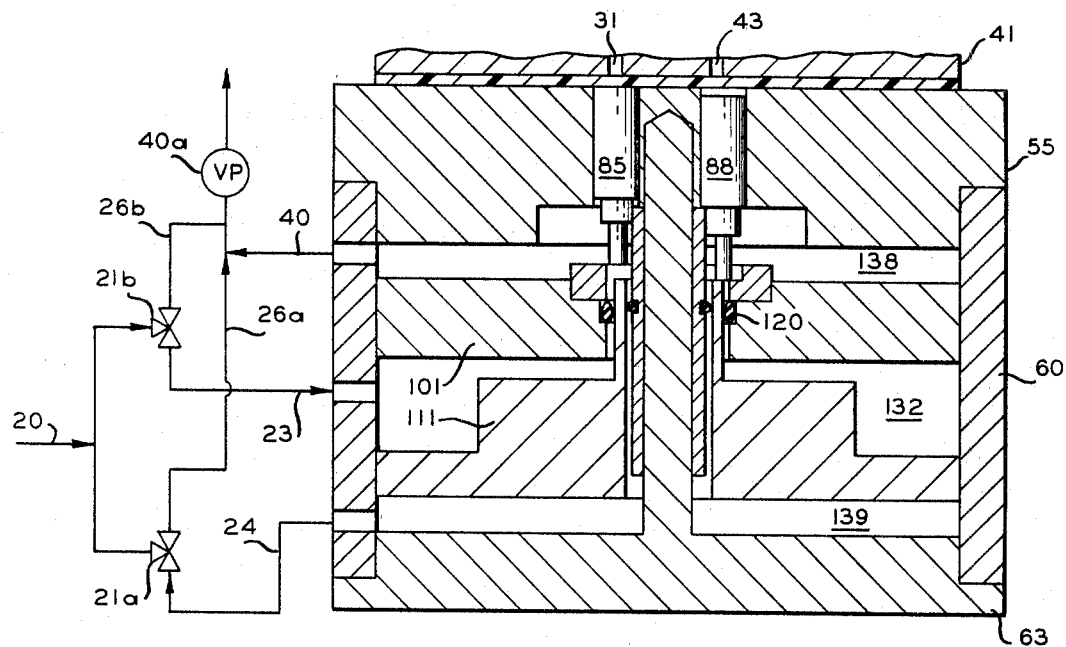
FIGURE 6 is a schematic diagram showing the operation of the valve system shown in FIGURE 5 during a second interval of time.

Referring now specifically to FIGURE 6, which shows the valve during a second interval of time, in the excited position. Power gas passes through line 20, valve 21a, line 23 to piston chamber 132. At the same time, pressure is evacuated from chamber 139 through line 24, valve 21a, line 26a, and vacuum pump 40a. Also, as was the case in FIGURE 5, pressure is evacuated from chamber 138, through line 40 and vacuum pump 40a. The switching from the first interval of time (the at-rest position) to the second interval of time (the excited position) is determined by programmer 38. As power gas pressure builds up in chamber 132, it overcomes force on air-loaded power piston 101, first overcoming weak retracting springs 102 and contacting shorter piston rods 85, 87 and 89, raising them to make sealing contact with the adjacent portion of cushion 83 and diaphragm 76, causing the latter to seal against the lower face of cap 41, thus shutting off sample in carrier gas flow through valve 22.

According to the invention, after sufficient pressure has built up in piston chamber 132, valve 21a is switched to exhaust pressure from bottom piston chamber 139 thereby allowing piston 111 to drop. This movement of piston 111 allows longer rods 84, 86 and 88 to retract into their vertical passages about .010 inch, by seating on the upper end of bushing 119. The notched recesses, such as 115, must be at least .020 inch deep, .010 inch of which is to allow short rods, such as 85, to rise into sealing position on power gas signal, and the other .010 inch of which is to allow long rod, such as 88, to retract sufficiently open to allow flow across the vertical passage between the recesses adjacent the spaced passages.

This sequence is characterized as a "make seal before break seal" mode of operation, which prevents leakage of fluids from one path of flow to the alternate, as the paths of flow are being alternated.

Carrier gas from conduit 27 still enters valve 22 via passage 48, passing downwardly to the lower face of cap 21. Since in this excited position, shorter rod 89 is in sealing contact with diaphragm, carrier gas flows from recess 96 across the top of vertical passage 77, under the diaphragm, over to recess 91 and into spaced passage 49, and thence to sample loop, driving the sample slug trapped therein before it. The carrier gas, with sample fluid entrained, re-enters valve 22 from loop 32 via conduit 43 and spaced passage 52. Since shorter rod 87 is in sealing contact with the diaphragm, sample flows from recess 94 across the top of vertical passage 81, under the diaphragm, over to recess 95 and into spaced passage 53, and out via conduit 28 to sorption column 29 for separation of the constituents in the sample slug in said column.

Simultaneously, sample fluid still enters valve 22 through passage 50. Since shorter rod 85 is in sealing contact with the diaphragm, sample fluid flows from recess 92 across vertical passage 79 over to recess 93 and into spaced passage 51, and out of valve 22, via conduit 33 to sample exhaust.

When pilot valve 21 switches back to the non-excited position, power gas is exhausted from middle chamber 132 by line 23, valve 21 and line 26. At the same time, power gas is supplied to bottom chamber 139 and the power pistons returned to their initially described position in reverse sequence and the two sets of piston rods also revert back to the position shown in FIGURES 4 and 5.

Specific example

The apparatus described was used to sample a liquid stream containing hydrogen and a carrier, cyclohexane at pressures up to 1175 p.s.i. It was necessary to keep the sample stream under pressure until the sample was removed because tests were run to determine the solubility of hydrogen in benzene and cyclohexane. The sampling worked out satisfactorily with the aforedescribed sampling valve. Satisfactory chromatographs were obtained.

When operating the valve of the invention at elevated pressures, it may be desirable to use external clamping means to attach body 41 or 55 to body 63. The additional strengthening means will depend on the exact uses of the sampling valve as understood by one skilled in the art.

By the use of the valve according to the invention, a standard valve can be altered to operate at high or low pressures regardless of the sample or carrier gas stream pressures.

Reasonable variation and modification are possible within the scope of the foregoing disclosure, the drawings, and the claims to the invention without departing from the spirit thereof.

I claim:
1. A fluid-motor actuated valve system for distributing a first fluid to a selected conduit comprising, in combination: a first body having two opposite faces; first, second, and third spaced passages in said body, each of said spaced passages communicating between said faces; a second body having an upper face spaced from the lower face of said first body; a first flexible sealing diaphragm of a diameter at least sufficient to cover said spaced passages; first, second, and third cylindrical recesses in said upper face, opposite said first, second, and third spaced passages, respectively; first and second cylindrical passages traversing said second body, within the circle described by said cylindrical recesses; first and second plunger rods slidably disposed in said first and second cylindrical passages, respectively; the upper ends of said first and second rods adjacent said diaphragm and intermediate the ports of said first, second, and third spaced passages, so that said first rod seals against said diaphragm intermediate said first and second spaced passages, and so that said second rod seals against said diaphragm intermediate said second and third spaced passages; a first power piston disposed adjacent and below said second body and normally biased out of contact with said second rod; a first chamber defined by the lower face of said second body and the upper face of said first power piston; first biasing means disposed in said first chamber normally biasing said first piston downward; a second power piston disposed adjacent and below said first power piston adapted to contact said first plunger rod; a third body disposed adjacent and below said second piston and normally spaced therefrom; a second chamber defined at its upper end by the lower face of said first power piston and at its lower end by the upper face of said second power piston; a third chamber defined at its upper end by the lower face of said second power piston and at its lower end by said third body; said first chamber, said second chamber and said third chamber being pneumatically sealed from each other; a cylindrical casing the inner surface of which makes sealing contact with the peripheries of said power pistons, the upper edge of said casing makes sealing contact with said second body, and the lower edge of said casing makes sealing contact with said third body; means to secure said first, second, and third bodies and said power pistons adjacent to one another in a fixed relationship; a first conduit means connected to supply said first fluid to be distributed under a first pressure to said second spaced passage; a second conduit means connected to receive said first fluid from said first spaced passage; a third conduit means connected to receive said first fluid from said third spaced passage; a fourth conduit means connected to supply, during a first time interval, a second fluid under a second pressure greater than said first pressure to said second chamber to exert upward pressure on said first power piston, first overcoming said first biasing means and exerting force on said second plunger rod, contacting the upper side of said first power piston to force a first portion of said sealing diaphragm adjacent thereto to seal between the ports of said third and second spaced passages of said first body; said second fluid simultaneously exerting increasing downward pressure on said second power piston, thus retracting said second piston means, permitting said first plunger rod to break sealing contact with a second portion of said sealing diaphragm adjacent thereto, thereby establishing communication between the ports of said first and second spaced passages; whereby first fluid enters said valve system through said second passage and passes out of said system through said first passage; a fifth conduit adapted to supply fluid pressure to said third chamber during a second interval of time to bias said second piston upwardly, said fifth conduit adapted to vent said third chamber during said first time interval; said fourth conduit means adapted to vent said second chamber, during a second time interval, whereupon said power pistons revert to their first described position, during which said first fluid pressure will establish communication between said third and second spaced passages under said diaphragm, while maintaining sealing communication between said first and second spaced passages, whereby said first fluid enters said system through said second spaced passage and passes out of said system through said third passage.

2. A fluid-motor actuated valve system according to claim 1 wherein said first chamber has in communication with it a means for evacuating the same.

3. A fluid-motor actuated valve system according to claim 2 wherein said fourth conduit means has in communication therewith an evacuation means during said second time interval.

4. A fluid-motor actuated valve system according to claim 2 wherein said fifth conduit means is in communication with an evacuation means during said first time interval.

5. A fluid-motor actuated valve system according to claim 2 wherein said first chamber and said third chamber are in communication during said first time interval and said first chamber and said second chamber are in communication during said second time interval.

6. A fluid-motor actuated valve system according to claim 5 wherein said evacuation means is a vacuum pump.

References Cited
UNITED STATES PATENTS 3,140,615   7/1964   Broerman _____ 73—422

LOUIS R. PRINCE, *Primary Examiner.*

S. C. SWISHER, *Assistant Examiner.*